United States Patent
Yu

(10) Patent No.: US 7,907,909 B2
(45) Date of Patent: Mar. 15, 2011

(54) METHOD AND SYSTEM FOR RADIO FREQUENCY (RF) GROUP DELAY COMPENSATION IN A BROADCAST SYSTEM

(75) Inventor: Xiaoyong Yu, Grayslake, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 143 days.

(21) Appl. No.: 12/233,304

(22) Filed: Sep. 18, 2008

(65) Prior Publication Data

US 2010/0067363 A1 Mar. 18, 2010

(51) Int. Cl.
*H04B 17/00* (2006.01)

(52) U.S. Cl. .......... 455/67.16; 370/204; 370/205; 375/371

(58) Field of Classification Search .......... 370/203, 370/206, 208; 375/354, 371; 455/39, 67.11, 455/67.16
See application file for complete search history.

(56) References Cited

U.S. PATENT DOCUMENTS

| 7,079,870 | B2 | 7/2006 | Vaidyanathan |
| 7,149,482 | B2 | 12/2006 | Kenington |
| 7,248,649 | B2 | 7/2007 | Demir et al. |
| 7,577,206 | B2 * | 8/2009 | Kim .............. 375/260 |
| 2004/0048584 | A1 | 3/2004 | Vaidyyanathan et al. |
| 2007/0058750 | A1 | 3/2007 | See et al. |
| 2007/0253497 | A1* | 11/2007 | Chen .............. 375/260 |
| 2009/0247209 | A1* | 10/2009 | Cho et al. .............. 455/522 |

FOREIGN PATENT DOCUMENTS

WO 2008107825 A1 9/2008

OTHER PUBLICATIONS

Ha, Eu Ju: "The International Search Report and The Written Opinion of the International Searching Authority", Korean Intellectual Property Office, Daejeon, completed: Mar. 12, 2010, mailed: Mar. 15, 2010, all pages.

* cited by examiner

*Primary Examiner* — Chi H Pham
*Assistant Examiner* — Weibin Huang

(57) ABSTRACT

A radio device operable to compensate for a large RF filter group delay variation is provided. The radio device includes a receiving unit operable to receive an OFDM signal that comprises pilot subcarrier signals and data subcarrier signals. The radio device further includes a group delay (GD) compensator, operable in frequency domain, and configured to perform phase rotation to correct a group delay individually on tones of an OFDM symbol. The phase rotation is calculated as a function of the phase shifts of the received pilot subcarrier signals and subcarrier index.

15 Claims, 7 Drawing Sheets

FIG. 5

| k/m | 1 | 2 | 3 |
|---|---|---|---|
| 1 | P | D | P |
| 2 | D | D | D |
| 3 | D | D | D |
| 4 | P | D | P |

FIG. 6

| k/m | 1 | 2 | 3 | |
|---|---|---|---|---|
| 1 | D | D | D | |
| 2 | P | D | D | PILOT |
| 3 | D | D | D | |
| 4 | D | D | D | |
| 5 | D | P | D | |
| 6 | D | D | D | |
| 7 | D | D | D | |
| 8 | D | D | P | |
| 9 | D | D | D | |
| 10 | D | D | D | |
| 11 | P | D | D | |
| 12 | D | D | D | |
| 13 | D | D | D | |
| 14 | D | P | D | |
| 15 | D | D | D | |
| 16 | D | D | D | |
| 17 | D | D | P | |
| 18 | D | D | D | |

US 7,907,909 B2

METHOD AND SYSTEM FOR RADIO FREQUENCY (RF) GROUP DELAY COMPENSATION IN A BROADCAST SYSTEM

BACKGROUND

1. Technical Field

The present invention relates generally to radio devices and in particular a method and system for radio frequency (RF) group delay compensation in a broadband orthogonal frequency division multiplexing (OFDM) system.

2. Description of the Related Art

A constant group delay from an RF filter generally has little to no impact on a receiver's performance. Therefore, when designing a RF filter, the group delay variation should be kept as small as possible within a signal bandwidth. For broadband OFDM systems, the transmitted signal is very susceptible to a phase offset due to a group delay.

In operation, the group delay of a RF filter or combiner varies based on variations in ambient or environment temperatures. Thus, as the ambient temperature changes, the group delay within a signal bandwidth consequently varies. Therefore, maintaining a constant group delay in a particular RF filter or combiner of a particular receiver is virtually impossible.

For example, FIG. 8 shows a plot of two group delay measurements P1 and P2 (in ns) versus frequency. The group delay measurements are for a RF cavity combiner used in a Worldwide Interoperability for Microwave Access (WiMAX) base station in ambient temperatures 50° C. (P1) and −40° C. (P2), respectively. As can be readily seen, those tones close to a band edge suffer a large group delay variation. The center of the band corresponds to a frequency of 0 Hz. In the center of the band, the group delay is more constant as compared to those frequencies moving in the direction of the band edge.

The receiver's equalizer could compensate for some phase offset due to a group delay. In the case of a low level modulation and coding scheme (MCS), such as QPSK modulation, the system performance degradation would be negligible for group delay compensations carried out by the receiver's equalizer. However, when the MCS level is high (e.g. 64 Quadrature Amplitude Modulation (64 QAM)) and a large group delay variation close to the band edges is present, the group delay will significantly impact the receiver's performance. For example, the receiver's performance may result in a failure associated with a sensitivity test at BER $10^{-6}$ in WiMAX radio conformance tests (RCT).

The large performance degradation of high MCS resulting from group delay is contributable to an uncorrectable portion of a phase error associated with a linear equalizer that is implemented in an OFDM receiver. Measurements indicate that the uncorrectable phase error within a slot associated with a linear equalizer, such as for 2×3 adaptive modulation and coding (AMC), could be a number of degrees. Thus, known linear equalizers in OFDM receivers do not compensate for a large RF filter group delay variation.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein:

FIG. 5 depicts a partially used sub-channel (PUSC) tile illustrating a data and pilot subcarrier arrangement which is transmitted by a mobile user station of FIG. 4 and received at a base station, in accordance with one embodiment of the invention;

FIG. 6 depicts a 2×3 adaptive modulation and coding (AMC) slot illustrating a data and pilot subcarrier arrangement which is transmitted by a mobile user station of FIG. 4 and received at a base station, in accordance with one embodiment of the invention;

DETAILED DESCRIPTION OF AN ILLUSTRATIVE EMBODIMENT

Figure 1:
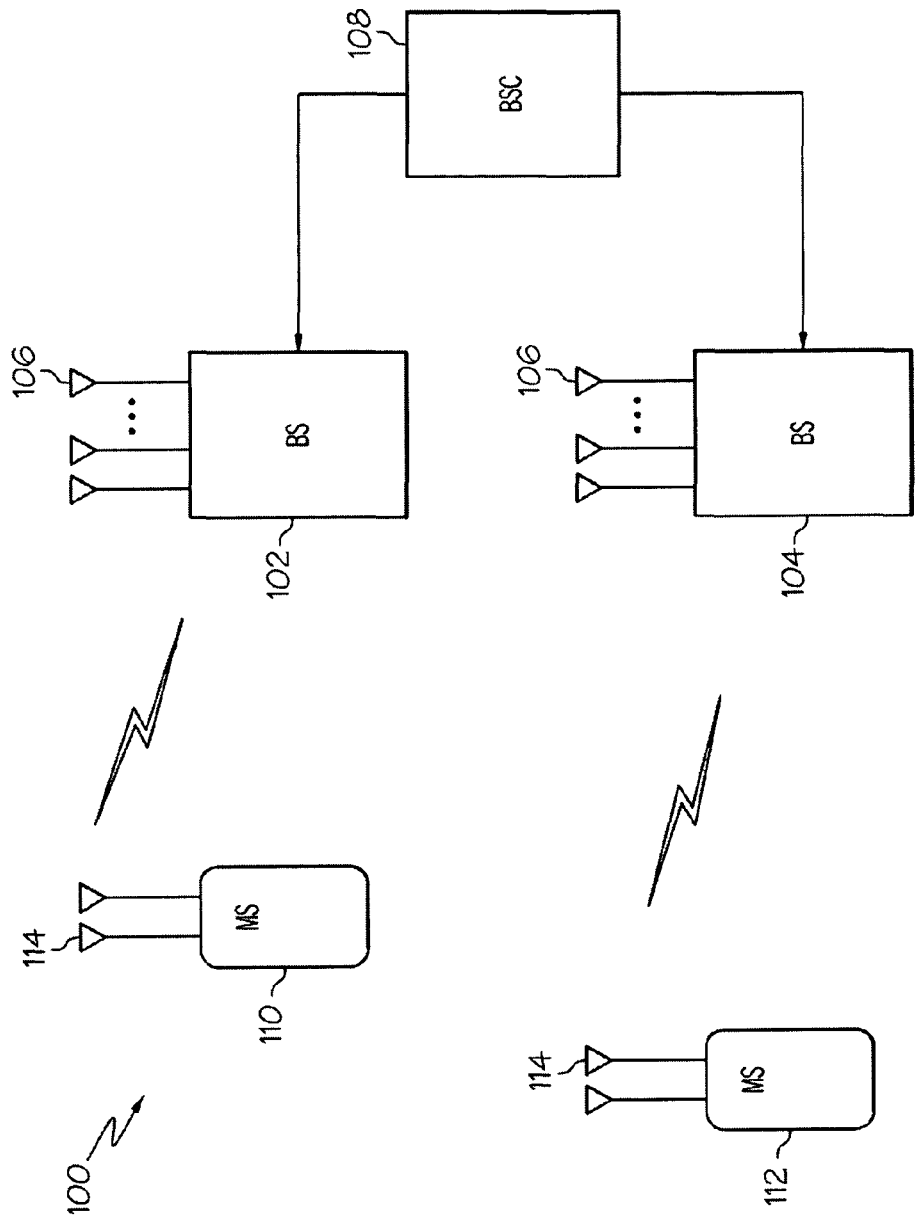
FIG. 1 is a block diagram of a wireless communication network used in conjunction with some embodiments of the invention.

The illustrative embodiments provide a method and system that calculates a group delay (GD) for received tiles or slots based on phase shifts of received pilot subcarrier signals and performs group delay compensation (GDC) by performing a phase rotation for each tone of an OFDM symbol in the amount that is proportional to the calculated GD at a radio device.

In the following detailed description of illustrative embodiments, specific illustrative embodiments by which the invention is practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims and equivalents thereof.

The figures described below are provided as examples within the illustrative embodiment(s), and are not to be construed as providing any architectural, structural or functional limitation on the present invention. The figures and descriptions accompanying them are to be given their broadest reading including any possible equivalents thereof.

Within the descriptions of the figures, similar elements are provided similar names and reference numerals as those of the previous figure(s). The specific numerals assigned to the elements are provided solely to aid in the description and not meant to imply any limitations (structural or functional) on the invention. It should be understood that the use of specific parameter names are for example only and not meant to imply any limitations on the invention. The invention may thus be implemented with different nomenclature/terminology utilized to describe the parameters herein, without limitation.

With reference now to the figures, FIG. 1 illustrates a wireless communication network 100 using the principles of the present invention as described herein. In an embodiment of the invention, the wireless communication network is one of Worldwide Interoperability for Microwave Access (WiMAX) compatible system, $3^{rd}$ Generation Protocol Partnership (3GPP) LTE system, Wireless Fidelity (Wi-Fi) based Wireless Local Area Network (WLAN) and other wireless network that employs OFDM. As should be understood by those of skill in the art that the various configurations may require the use of one or more of the antennas supplied at each of the base station (BS) and the mobile user station (MS).

The wireless communication network 100 includes a plurality of base stations (BSs) 102 and 104 that are known in the art and that operate according to the various requirements set for operation of the networks. Each of the BSs 102 and 104 can be configured with a plurality of antennas 106. The BSs 102 and 104 are typically connected to a base station controller (BSC) 108 that provides control information to the BSs 102 and 104 in accordance with known methods so that the BSs 102 and 104 operate according to the given network or system requirements. The network 100 also includes mobile user stations (MSs) 110 and 112 that can be supplied with a plurality of antennas 114.

As should be understood by those of skill in the art, the MSs 110 and 112 can move throughout the network 100. As the MSs 110 and 112 move, a MS 110, 112 connects to a BS 102, 104 that provides wireless communication service to the area, known as a cell, in which that MS 110, 112 is located.

Figure 2:
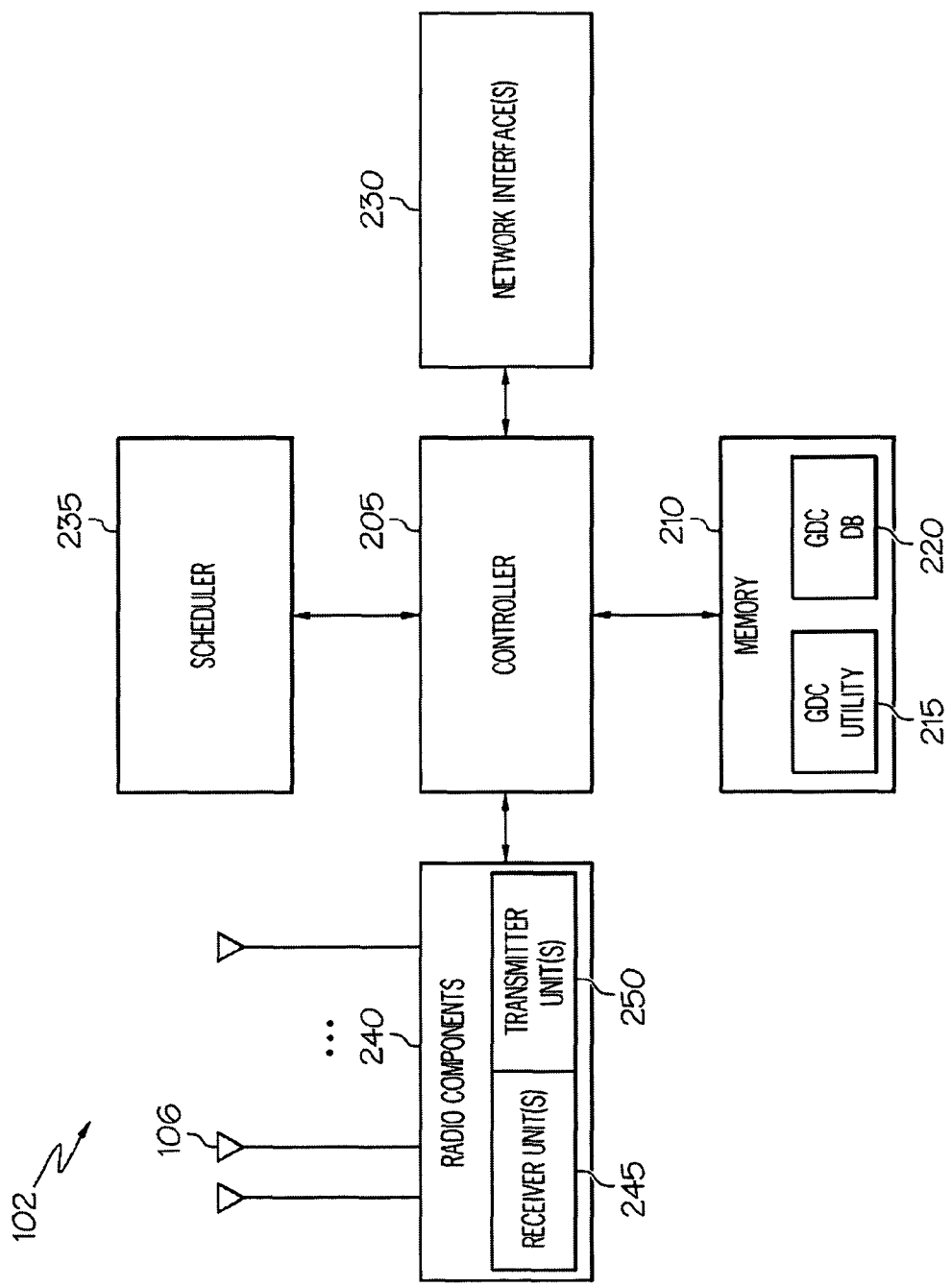
FIG. 2 is a block diagram representation of an example radio device, which is a base station, configured with the functional capabilities required for enabling group delay compensation based on received pilot subcarriers, in accordance with one embodiment of the invention.

Turning now to FIG. 2, a block diagram representation of an example radio device, which is a base station such as BS 102, is configured with the functional capabilities required for enabling group delay compensation based on received pilot subcarriers, in accordance with one embodiment of the invention. However, it should be understood that the functions of the invention are applicable to other types of radio devices and that the illustration of a radio device and description thereof as a base station 102 is provided solely for illustration. For example, the whole invention can be applied to a mobile user station (MS).

BS 102 comprises central controller 205 which is connected to memory 210 and which controls the communications operations of BS 102 including generation, transmission, reception, and decoding of radio signals from one or more MSs 110, 112. Controller 205 may comprise one or more programmable microprocessors that control the overall function of BS 102. For example, the one or more programmable microprocessors control functions associated with the processing of the present invention as well as other control, data processing and signal processing that is required by BS 102.

As illustrated, BS 102 also comprises network interfaces 230 for communications with at least BSC 108, a scheduler 235 and radio components 240 which are all connected to controller 205. Radio components 240 are connected to antennas 106 at which digitized radio frequency (RF) signals are received by at least one receiver unit 245 and transmitted by at least one transmitter unit 250. Receiver unit(s) 245 and transmitter unit(s) 250, in combination with antenna 106, enable BS 102 to transmit and receive wireless RF signals from and to MS 110 or 112. In addition to the above hardware components, several functions of BS 102 and specific features of the invention are provided as software code, which is stored within memory 210 and executed by the one or more processors within controller 205. The one or more processors execute various control software (not shown) to provide overall control for the BS 102, including group delay compensation (GDC). The combination of software and/or firmware that collectively provides the functions of the invention is referred to herein as a group delay compensation (GDC) utility 215.

As provided by the invention and illustrated within memory 210, a GDC utility 215, has associated therewith a GDC database 220. The functionality of GDC utility 215 and GDC database 220 will be described in greater detail below. However, when executed by the one or more processors, key functions provided by GDC utility 215 include, but are not limited to: (1) receiving an input of FFT outputs of received signals by BS 102; (2) determining a phase of pilot subcarrier signals in the received tile or slot for the same physical frequency; (3) estimate a group delay compensation (GDC) coefficient for the tile or slot; (4) calculate a phase rotation for each respective tone of an OFDM symbol within a tile or slot based on the estimated GDC coefficient; (5) apply the phase rotations to the corresponding tones of the OFDM symbol within the tile or slot to compensate group delays and, especially, group delays associated with a high level MSC. GDC database 220 stores any values, calculations, estimates and results used by GDC utility 215 to perform the group delay compensation.

Those of ordinary skill in the art will appreciate that the hardware depicted in FIG. 2 may vary depending on implementation. Other internal hardware devices may be used in addition to or in place of the hardware depicted in FIG. 2. The depicted example is not meant to imply architectural limitations with respect to the present invention.

While specifically shown to include software/firmware level functional components, it is contemplated that various functions of radio components 240 may involve the use of either hardware or software filters, mixers, amplifiers, converters, and other receiver components. The specific description herein is thus solely intended to provide an illustration of one possible embodiment by which the features may be implemented, and are not intended to be limiting on the invention, which is to be given the broadest possible scope to cover any equivalent implementations.

Figure 3:
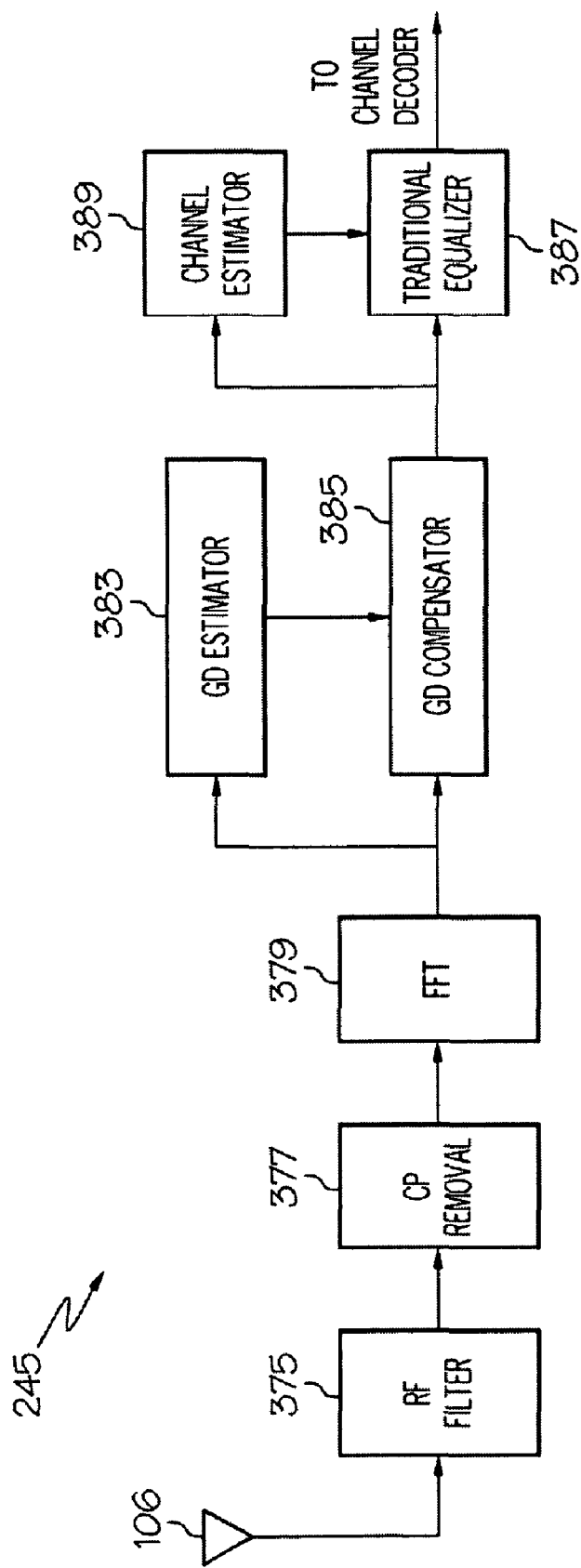
FIG. 3 is a detailed block diagram representation of a receiver unit for the radio device of FIG. 2 for enabling group delay compensation (GDC), according to one embodiment of the invention.

FIG. 3 is a detailed block diagram representation of a receiver unit 245 for the BS of FIG. 2 for enabling group delay (GD) compensation, according to one embodiment of the invention. Receiver unit 245 includes antenna 106 for receiving digital modulated signals such as from MS 110 (FIG. 4) in an OFDM system. Receiver unit 245 includes an RF filter 375 coupled to cyclical prefix remover 377. The output of the cyclical prefix remover 377 is sent to a Fast Fourier Transform (FFT) calculator 379 producing an output representative of a FFT of the received modulated signal. The output of FFT calculator 379 is sent to both a group delay (GD) estimator 383 and GD compensator 385, the operation of which is described in detail later.

Notably, also illustrated by FIG. 3, the output of GD compensator 385 is sent to both a channel estimator 389 and a traditional equalizer 387. The output of traditional equalizer 387 is sent to a channel decoder (NOT SHOWN). Channel estimator 389 may estimate a frequency offset which is used to adjust the FFT output. The channel response may be iteratively estimated which is well known in the art. For example, channel estimator 389 may adjust one or more taps (NOT SHOWN) of the traditional equalizer 387. The GDC, according to one embodiment of the present invention, takes place between the FFT calculator 379 and the traditional equalizer 387. GD estimator 383 is operable in frequency domain and configured to estimate a particular group delay value associated with a particular frequency bandwidth or a number of consecutive tones. GD compensator 385 is operable in the frequency domain and configured to perform phase rotation to correct a group delay individually on tones of an OFDM symbol of the modulated signal in response to phase shifts resulted from the group delay to generate a GD compensated modulated signal.

Figure 4:
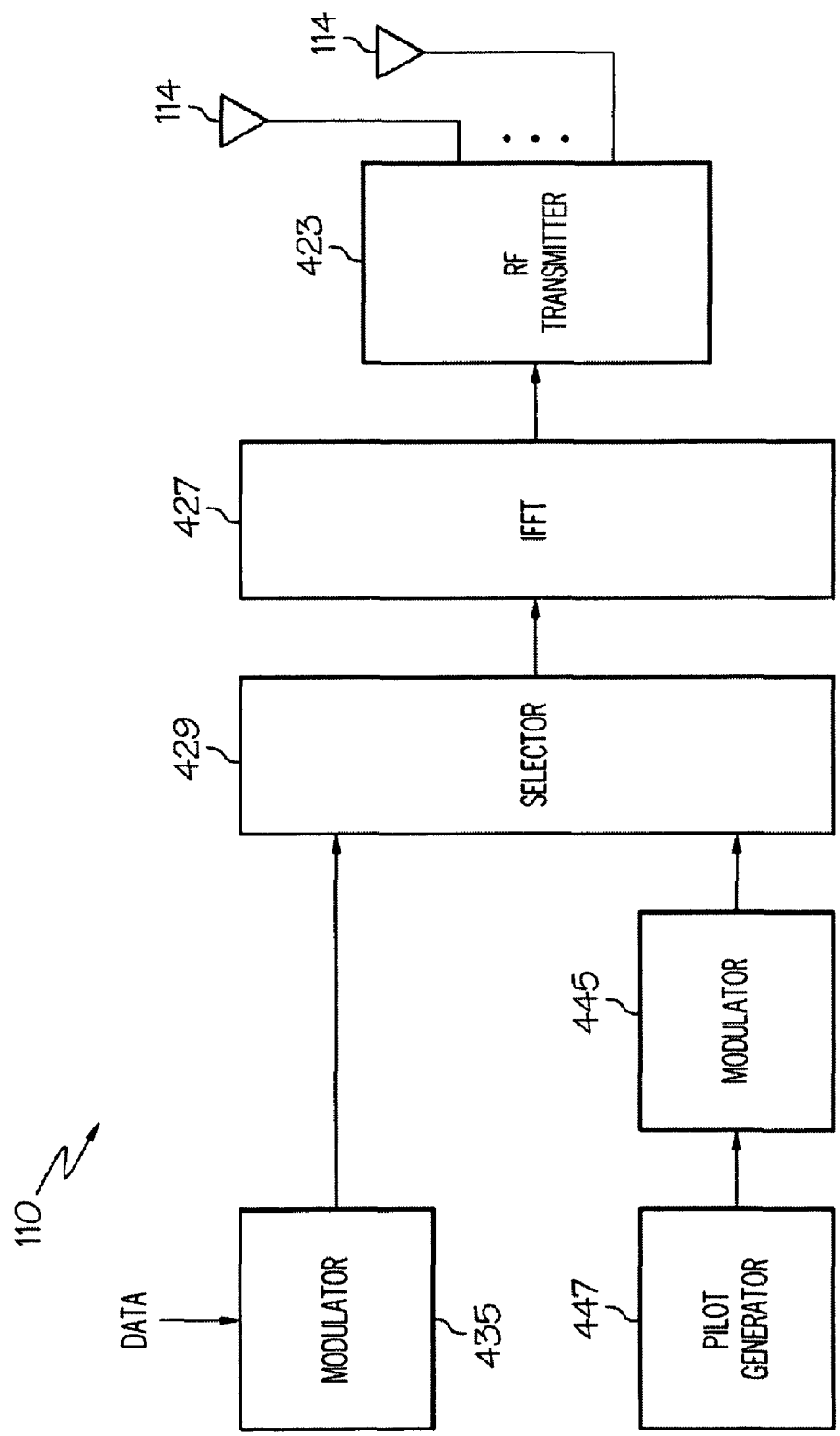
FIG. 4 is a block diagram representation of a mobile user station according to one embodiment of the invention.

FIG. 4 is a block diagram representation of a mobile user station (MS) 110 configured to operate in an OFDM system. MS 110 includes a modulator 435 for modulating and coding data and a modulator 445 for modulating and coding a pilot signal. Modulator 435 receives data as input. Modulator 445 receives a pilot signal generated from a pilot generator 447. The outputs of both modulators 435 and 445 are sent to a selector 429 to generate a tile, slot or other composite digital signal, such as shown in FIGS. 5 and 6, as will be described in more detail.

The output of the selector 429 is sent to an Inverse Fast Fourier Transform (IFFT) calculator 427, the output of which is transmitted by RF transmitter 423 through one or more of antennas 114. In the illustrative embodiment the signal is compatible with at least one of WiMAX, an OFDM or broadband OFDM. Since the description of each signal structure is prohibitive, two different signal structures are described below for illustrative purposes. The signal structure described herein produce a partially used sub-channel (PUSC) tile and a 2×3 adaptive modulation and coding AMC slot.

FIG. 5 depicts a partially used sub-channel (PUSC) tile 500 illustrating a data and pilot subcarrier arrangement transmitted by the MS 110 of FIG. 4, in accordance with one embodiment of the invention. PUSC tile 500 has K=4 consecutive tones within M=3 OFDM symbols. PUSC tile 500 is an K×M tile where K is the number of tones in a tile while k is tone index that takes value from 1, 2, 3 and 4; and M is the number of OFDM symbols in a tile while m is the symbol index within the tile, clearly m=1, 2 or 3. The pilot subcarrier signals within a tile are associated with index pair (k, m) that can be (1,1), (1,3), (4,1) and (4,3). The remaining index pair of (k, m), namely (1,2), (2,1), (2,2), (2,3), (3,1), (3,2), (3,3) and (4,2) are data subcarrier signals.

FIG. 6 depicts a 2×3 adaptive modulation and coding (AMC) slot 600 illustrating a data and pilot subcarrier arrangement transmitted by MS 110 of FIG. 4, in accordance with one embodiment of the invention. Each sub-carrier of AMC slot 600 is also identified by a 2-dimensional index, i.e., (m, k), where k is the tone index taking values 1, 2, . . . , K and m is the OFDM symbol index taking values 1, 2 and M. In the illustration, AMC slot 600 has K=18 consecutive tones within M=3 OFDM symbols. The pilot subcarrier signals are labeled (1,2), (1,11), (2,5), (2,14), (3,8) and (3,17). The remaining sub-carriers of AMC slot 600 are used for data signals.

A detailed description of the calculations for the GDC by the GDC utility 215 will now be described. By definition, the group delay τ is the rate of total phase change with respect to angular frequency, as defined according to equation (1)

$$\tau = -\frac{d\phi}{d\omega} = -\frac{d\phi}{2\pi df} \qquad (1)$$

where ø is a total phase shift in radians; and ω is an angular frequency in radians; and f is a frequency in Hz.

Consequently, the phase shift change rate Δø over a certain frequency change rate Δf, due to a group delay τ, can be approximated by equation (2)

$$\Delta ø = -2\pi\tau\Delta f. \qquad (2)$$

If the group delay τ is a constant denoted by c, then the phase shift ø is a linear function of frequency or the tone index (denoted as k) for OFDM systems.

For example, for a PUSC tile transmission, the phase shift $ø_k$ due to constant group delay c in PUSC tile 500 (e.g. K=4 consecutive tones within M=3 OFDM symbols, as shown in FIG. 5) for each tone of an OFDM symbols can be expressed as equations (3a), (3b), (3c), (3d)

$$ø_1=\theta \qquad (3a)$$

$$ø_2=ø_1-2\pi c\Delta f=\theta-2\pi c\Delta f \qquad (3b)$$

$$ø_3=ø_2-2\pi c\Delta f=\theta-4\pi c\Delta f \qquad (3c)$$

$$ø_4=ø_3-2\pi c\Delta f=\theta-6\pi c\Delta f \qquad (3d)$$

where $ø_k$ is the phase shift for the tone with index k where k takes a value from 1 to 4; θ is the phase shift $ø_1$ of the first tone of PUSC tile 500; and Δf is the tone spacing that depends on or is a function of the OFDM signal bandwidth and FFT size (e.g. Δf=10937.5 Hz for 10 MHz WiMAX system). Traditional equalizer 387 compensate for a constant delay thus there is no need to correct a constant group delay by GDC utility 215. If the GDC coefficient λ is below a threshold in magnitude, then the GDC coefficient can be forced to zero. Then, associated sub-carriers are multiplied by 1 by GDC utility 215, The phase shift $ø_k$ is a linear function of tone index k with a slope −2πΔf. The phase shift $ø_k$, due to a constant delay c, can be compensated by a linear equalizer, such as traditional equalizer 387 (FIG. 3). However, if the group delay τ is not a constant, the phase shift $ø_k$ across the K-tones is no longer a linear function. For example, if the group delay τ is a linear function of tones in a PUSC tile 500, the group delay τ may be expressed as $\tau_k=\lambda_k$, where k is the tone index and GDC coefficient λ is a constant related to the slope of linear model. Thus, the phase shift $ø_k$, for a PUSC tile 500, is defined according to equations (4a), 4b), (4c), (4d)

$$ø_1=\theta; \qquad (4a)$$

$$ø_2=ø_1-2\pi\tau_1\Delta f=\theta-2\pi\lambda\Delta f; \qquad (4b)$$

$$ø_3=ø_2-2\pi\tau_2\Delta f=\theta-6\pi\lambda\Delta f; \text{ and} \qquad (4c)$$

$$ø_4=ø_3-2\pi\tau_3\Delta f=\theta-12\pi\lambda\Delta f \qquad (4d)$$

where $ø_k$ is the phase shift for the tone with index k; θ is the phase shift $ø_1$ of the first tone of the PUSC tile 500; and Δf is the tone spacing that depends on or is a function of the OFDM signal bandwidth and FFT size (e.g. Δf=10937.5 Hz for 10 MHz WiMAX system).

Similarly, for an AMC slot transmission (e.g. a 2×3 AMC slot of K=18 consecutive tones in frequency and M=3 OFDM symbols in time, as shown in FIG. 6), the phase shift $ø_k$ due to a group delay $\tau_k=\lambda k$ on each tone in a slot 600 is determined based on equation (5)

$$ø_k=ø_{k-1}-2\pi\tau_{k-1}\Delta f=\theta-\pi\lambda(k-1)k\Delta f \text{ for } k=1, 2, \ldots, 18 \qquad (5)$$

where θ is phase shift $ø_1$ of the first tone in an AMC slot 600; λ is a constant related to the slope of linear model of group delay; and Δf is the tone spacing that depends on or is a function of the OFDM signal bandwidth and FFT size (e.g. Δf=10937.5 Hz for 10 MHz WiMAX system).

Thus, when group delay is not a constant, the traditional linear equalizer 387, whose coefficients are determined by linear interpolation of received demodulated pilot subcarrier signals within a tile or slot, can not completely correct the phase error associated with the group delay. The residual phase error or uncorrectable phase error depends on the pilot subcarrier signal structure used in the system.

The group delay compensator 385 is a phase rotator to rotate individually the tones of an OFDM symbol based on the calculated phase shift $\phi_k$ for each individual tone of the OFDM symbol in the tile or slot. The phase shifts $\phi_k$ are determined by either equations (4a)-(4d) or equation (5) depending on if the signal structure is a PUSC tile 500 or an AMC slot 600. However, in lieu of the estimated GD value $\lambda_t$ for a tile or $\lambda_S$ for a slot based on the pilot subcarrier signals in a tile or slot, an averaged GDC coefficient $\tilde{\lambda}$ is calculated for a total number of tiles or slots in the same frequency of the signal bandwidth.

The estimated GD value $\lambda_t$ and the averaged GDC coefficient $\tilde{\lambda}$ are calculated by the GD estimator 383 based on equations (6) and (7), respectively, below. For a PUSC tile transmission, the group delay ($\tau_k = \lambda k$) is assumed to be a linear function of a tone within a PUSC tile (i.e. the group delay is a piece-wise linear function across all of the signal bandwidth). Then, the estimated GD value $\lambda_t$ is calculated based on a plurality of received pilot subcarrier signals of a given PUSC tile t according to equation (6)

$$\lambda_t = \frac{1}{2}\left(\frac{\phi_{1,1} - \phi_{1,4}}{12\pi\Delta f} + \frac{\phi_{3,1} - \phi_{3,4}}{12\pi\Delta f}\right) \quad (6)$$

where $\phi_{m,k}$ represents the phase shift of a demodulated pilot subcarrier signal on tone k and OFDM symbol m within the PUSC tile t; and $\Delta f$ refers to the tone spacing that depends on or is a function of the OFDM signal bandwidth and FFT size (e.g. $\Delta f=10937.5$ Hz for 10 MHz WiMAX system).

Then, an averaged GDC coefficient $\tilde{\lambda}$ for all tiles associated with the same frequency is defined in equation (7)

$$\tilde{\lambda} = \frac{1}{T}\sum_{t=1}^{T} \lambda_t \quad (7)$$

where T is total number of tiles having the same physical frequency. Consequently, the phase rotation in the GD compensator 385 is defined as the phase shift $\phi_k$ as determined using equations (4a)-(4d), where the GDC coefficient $\lambda$ is substituted by the corresponding averaged GDC coefficient $\tilde{\lambda}$ of equation (7).

Similarly, for a AMC slot transmission, an estimated GD value $\lambda_S$ per slot can be calculated according to equation (8)

$$\lambda_s = \frac{1}{3}\left(\frac{\phi_{1,2} - \phi_{1,11}}{108\pi\Delta f} + \frac{\phi_{2,5} - \phi_{2,14}}{162\pi\Delta f} + \frac{\phi_{3,8} - \phi_{3,17}}{216\pi\Delta f}\right) \quad (8)$$

where $\phi_{m,k}$ represents the phase shift of a demodulated pilot subcarrier signal on tone k and OFDM symbol m within the slot s; and $\Delta f$ refers to the tone spacing that depends on or is a function of the OFDM signal bandwidth and FFT size. (e.g. $\Delta f=10937.5$ Hz for 10 MHz WiMAX system).

Then, the averaged GDC coefficient $\tilde{\lambda}$ for all slots associated with the same frequency is estimated according to equation (9)

$$\tilde{\lambda} = \frac{1}{S}\sum_{s=1}^{S} \lambda_s \quad (9)$$

where S is total number of slots in a band that has the same physical frequency. Consequently, the phase rotation in the GD compensator 385 for each tone of an OFDM symbol, within the slot, is defined as the phase shift $\phi_k$ as determined using equation (5), where the GDC coefficient $\lambda$ is substituted by the corresponding averaged GDC coefficient $\tilde{\lambda}$ of equation (9).

Figure 7:
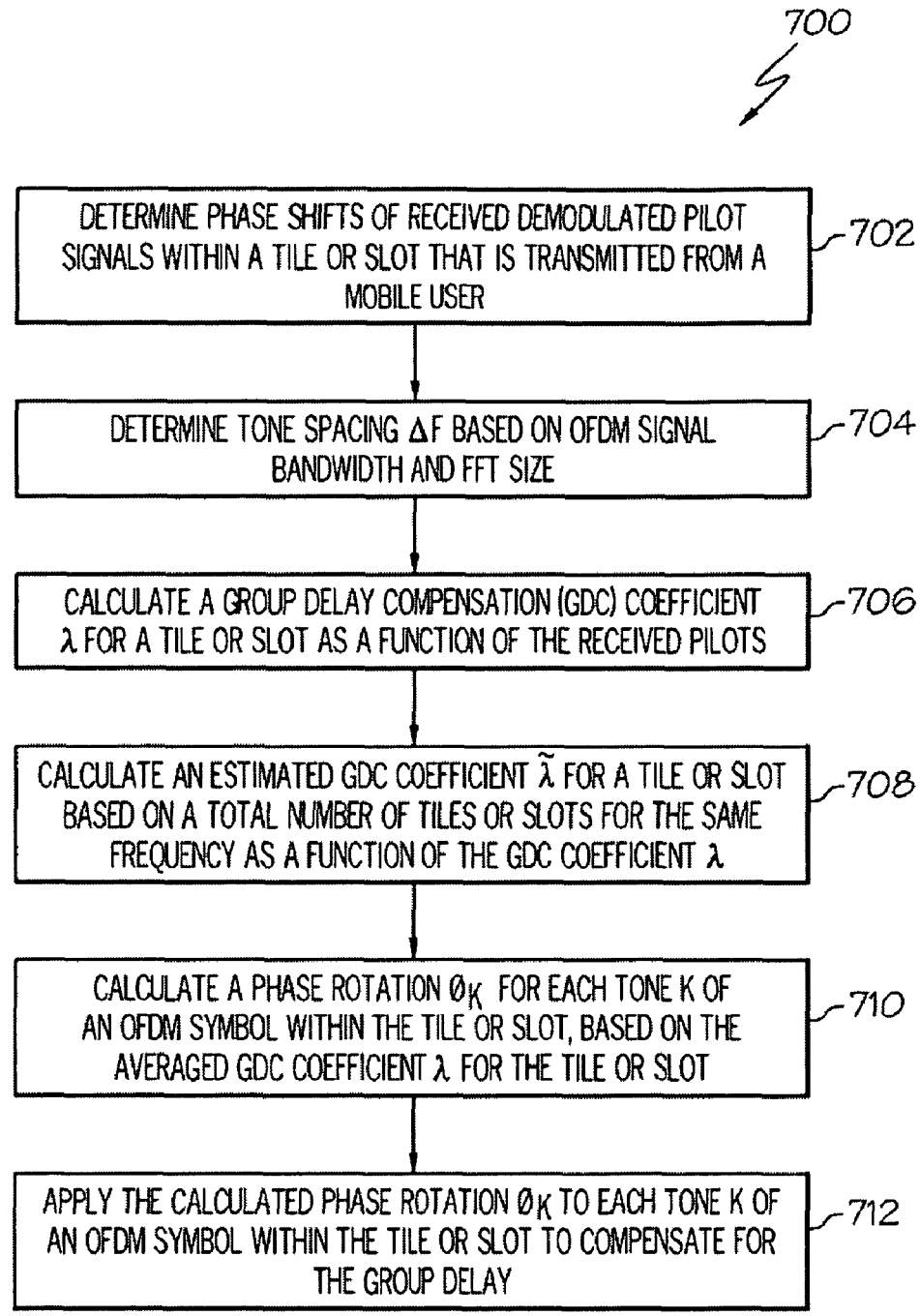
FIG. 7 is a flow chart illustrating the process for group delay compensation (GDC) for received tiles or slots via a GDC utility, in accordance with one embodiment of the invention.
Figure 8:
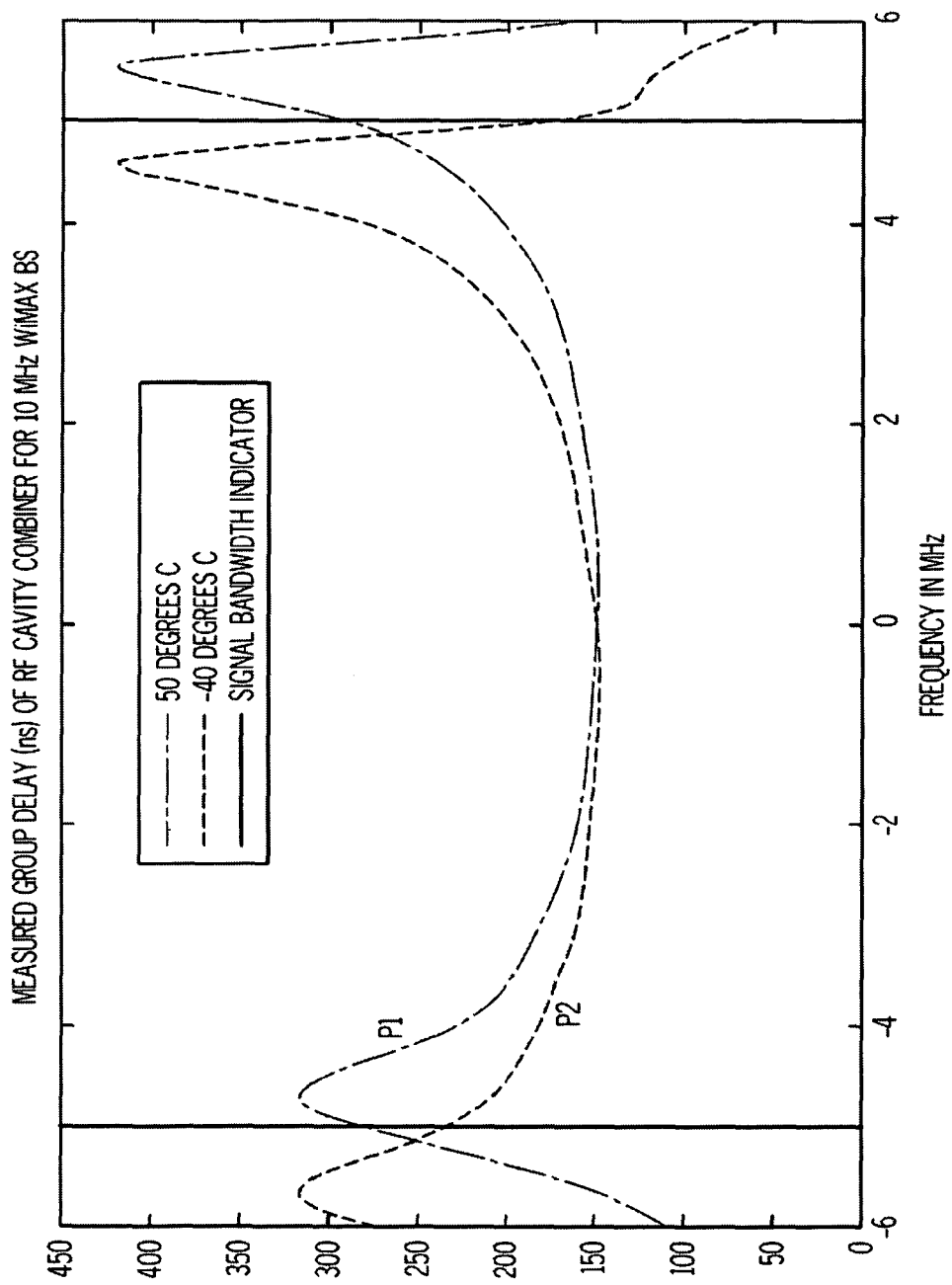
FIG. 8 shows a plot of a two group delay measurements (in ns) versus frequency for a RF cavity combiner used in a Worldwide Interoperability for Microwave Access (WiMAX) base station in ambient temperatures 50° C. and −40° C., respectively.

FIG. 7 is a flow chart illustrating the process 700 for group delay compensation of a received tile or slot via the GD utility 215, in accordance with one embodiment of the invention. At block 702 of process 700, a phase shift of each of the received demodulated pilot subcarrier signals within a tile or slot is determined. The pilot subcarrier signals were transmitted from the MS 110. At block 704, a tone spacing $\Delta f$ (e.g. $\Delta f=10937.5$ Hz for 10 MHz WiMAX system) on an OFDM signal is determined for the specific signal bandwidth and FFT size. At block 706, a GDC coefficient $\lambda$ is calculated in accordance with at least one tile or slot as a function of the phase shifts of the pilot subcarrier signals in accordance with equation (6) for a PUSC tile and equation (7) for an AMC slot. At block 708, an averaged GDC coefficient $\tilde{\lambda}$ is calculated (or estimated) for all tiles and slots that occupy the same frequency. The averaged GDC coefficient $\tilde{\lambda}$ is a function of the total number of tiles or slot in the same frequency for the signal bandwidth according to equation (7) for tiles and equation (9) for slots. At block 710, a phase rotation $\phi_k$ (or phase shift) for each individual tone k of an OFDM symbol within a tile or slot is determined as a function of the averaged GDC coefficient $\tilde{\lambda}$ where the averaged GDC coefficient $\tilde{\lambda}$ is substituted in equations (4a)-(4b) for tiles or equation (5) for slots. At block 712, the calculated phase rotation $\phi_k$ (or phase shift) for a tone k of an OFDM symbol within the tiles and slots is applied individually thereto to correct or compensate for the group delay.

Based on the foregoing, the GD compensator 385 corrects for all phase errors in the modulated signal caused by group delay at the receiver unit, particularly in between the FFT and traditional equalizer.

In the flowchart above, in some implementations, certain steps of the process may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non exclusive list of types of media includes recordable type (tangible) media such as floppy disks, thumb drives, hard disk drives, CD ROMs, DVDs, and transmission type media such as digital and analogue communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A radio device comprising:
a receiver unit operable in an orthogonal frequency division multiplexing (OFDM) system to receive a modulated signal that comprises multiple groups of consecutive sub-carriers or tones in one of a partially used subchannel (PUSC) tile and an adaptive modulation and coding (AMC) slot;
a group delay (GD) estimator operable in frequency domain and configured to estimate a particular group delay associated with a particular frequency bandwidth or a number of consecutive tones,
a GD compensator operable in the frequency domain and configured to perform phase rotation to correct the particular group delay individually on tones of an OFDM symbol of the modulated signal in response to phase shifts resulted from the group delay to generate a GD compensated modulated signal; wherein for the PUSC tile the phase rotation $\varnothing_k$ for each of the tones of the OFDM symbol within the tile is defined according to $\varnothing_1 = \theta$;

$\varnothing_2 = \varnothing_1 - 2\pi\tau_2\Delta f = \theta - 2\pi\tilde{\lambda}\Delta f$;

$\varnothing_3 = \varnothing_2 - 2\pi\tau_2\Delta f = \theta - 6\pi\tilde{\lambda}\Delta f$; and $\varnothing_4 = \varnothing_3 - 2\pi\tau_3\Delta f = \theta - 12\pi\tilde{\lambda}\Delta f$ where k is a tone index that takes a value from 1 to 4; θ is the phase rotation $\varnothing_1$ of a first tone of the PUSC tile; Δf is a tone spacing that depends on an OFDM signal bandwidth and a Fast Fourier Transform (FFT) size; and $\tilde{\lambda}$ is an averaged group delay compensation (GDC) coefficient defined as $$\tilde{\lambda} = \frac{1}{T}\sum_{t=1}^{T} \lambda_t$$

where T is a total number of PUSC tiles having a same physical frequency; and $\lambda_t$ is an estimated group delay value for the PUSC tile t, which is calculated based on the received pilot subcarrier signals according to $$\lambda_t = \frac{1}{2}\left(\frac{\phi_{1,1} - \phi_{1,4}}{12\pi\Delta f} + \frac{\phi_{3,1} - \phi_{3,4}}{12\pi\Delta f}\right)$$

where $\varnothing_{m,k}$ represents a phase shift of a demodulated pilot subcarrier signal on tone k and OFDM symbol m within the PUSC tile t; and
an equalizer operable in the frequency domain and configured to receive the GD compensated modulated signal from the GD compensator.

2. The radio device of claim 1, wherein for the AMC slot, the phase rotation $\varnothing_k$ for each of the tones of the OFDM symbol within a slot is defined according to $\varnothing_k = \varnothing_{k-1} - 2\pi\tau_{k-1}\Delta f = \pi\tilde{\lambda}(k-1)k\Delta f$ for $k=1, 2, \ldots, 18$ where θ is a phase shift of a first tone in the AMC slot; k is tone index of the slot; Δf is a tone spacing that depends on an OFDM signal bandwidth and Fast Fourier Transform (FFT) size; and $\tilde{\lambda}$ is an averaged group delay compensation (GDC) coefficient for the AMC slot defined as $$\tilde{\lambda} = \frac{1}{S}\sum_{s=1}^{S} \lambda_s$$

where S is a total number of slots in a band that has a same physical frequency; and where $\lambda_S$ is an estimated group delay value for the AMC slot s based on the phase shifts of the received demodulated pilot subcarrier signals, and is calculated as $$\lambda_s = \frac{1}{3}\left(\frac{\phi_{1,2} - \phi_{1,11}}{108\pi\Delta f} + \frac{\phi_{2,5} - \phi_{2,14}}{162\pi\Delta f} + \frac{\phi_{3,8} - \phi_{3,17}}{216\pi\Delta f}\right)$$

where $\varnothing_{m,k}$ represents a phase shift of a pilot subcarrier signal on tone k and symbol m within the AMC slot.

3. The radio device of claim 1, wherein the GD compensator is configured to correct all phase errors in the OFDM symbol, which may be caused by a radio frequency (RF) filter resulting from at least one of ambient temperatures at the receiving unit, any one of defects in radio frequency (RF) filter design, non-linearity of group delay across entire signal bandwidth.

4. The radio device of claim 1, wherein the received modulated signal is a broadband orthogonal frequency division multiplexing (OFDM) signal that can be used in Worldwide Interoperability for Microwave Access (WiMAX) compatible system, a 3$^{rd}$ Generation Protocol Partnership (3GPP) LTE system, and Wireless Fidelity (Wi-Fi) based Wireless Local Area Networks (WLANs).

5. The radio device of claim 1, wherein the GD estimator and the GD compensator are employed in one of a mobile user station and a base station.

6. A method for compensating for a group delay, the method comprising:
   receiving in an orthogonal frequency division multiplexing (OFDM) system a modulated signal that comprises one of a partially used sub-channel (PUSC) tile and an adaptive modulation and coding (AMC) slot;
   estimating a group delay (GD), in frequency domain, a particular group delay associated with a particular frequency bandwidth or a number of consecutive tones; and
   compensating for the GD, in the frequency domain, to apply a phase rotation to correct the particular group delay individually on tones of an OFDM symbol of the modulated signal in response to phase shifts resulted from the GD to generate a GD compensated modulated signal; wherein for the PUSC tile, the estimating of the GD comprises calculating a phase rotation $\varnothing_k$ for each of the tones of the OFDM symbol according to $$\varnothing_1 = \theta;$$

$$\varnothing_2 = \varnothing_1 - 2\pi\tau_1\Delta f = \theta - 2\pi\tilde{\lambda}\Delta f;$$

$$\varnothing_3 = \varnothing_2 - 2\pi\tau_2\Delta f = \theta - 6\pi\tilde{\lambda}\Delta f; \text{ and}$$

$$\varnothing_4 = \varnothing_3 - 2\pi\tau_3\Delta f = \theta - 12\pi\tilde{\lambda}\Delta f;$$

where k is a tone index that takes a value from 1 to 4, θ is the phase rotation $\varnothing_1$ of a first tone of the PUSC tile, and Δf is a tone spacing that depends on a OFDM signal bandwidth and Fast Fourier Transform (FFT) size; and
   estimating an averaged group delay compensation (GDC) coefficient $\tilde{\lambda}$ according to $$\tilde{\lambda} = \frac{1}{T}\sum_{t=1}^{T}\lambda_t$$

where T is total number of PUSC tiles having a same physical frequency, and where $\lambda_t$ is an estimated group delay value for the PUSC tile t which is calculated based on the received pilot subcarrier signals according to $$\lambda_t = \frac{1}{2}\left(\frac{\phi_{1,1} - \phi_{1,4}}{12\pi\Delta f} + \frac{\phi_{3,1} - \phi_{3,4}}{12\pi\Delta f}\right)$$

where $\varnothing_n$ represents a phase shift of a demodulated pilot subcarrier signal on tone k and OFDM symbol m within the PUSC tile t.

7. The method of claim 6, wherein for the AMC slot, the estimating of the GD comprises calculating a phase rotation $\varnothing_k$ for each of the tones of the OFDM symbol according to $$\varnothing_k = \varnothing_{k-1} - 2\pi\tau_{k-1}\Delta f = \theta - \pi\tilde{\lambda}(k-1)k\Delta f \text{ for } k=1, 2, \ldots, 18$$

where θ is a phase shift of a first tone in the AMC slot, k is tone index of the slot; and Δf is a tone spacing that is a function of a OFDM signal bandwidth and Fast Fourier Transform (FFT) size; and
   estimating an averaged group delay compensation (GDC) coefficient $\tilde{\lambda}$ for the AMC slot according to $$\tilde{\lambda} = \frac{1}{S}\sum_{s=1}^{S}\lambda_s$$

where S is a total number of slots in a band that has a same physical frequency, and where $\lambda_S$ is an estimated GD value for the AMC slot s based on the phase shifts of the received demodulated pilot subcarrier signals, and is calculated as $$\lambda_s = \frac{1}{3}\left(\frac{\phi_{1,2} - \phi_{1,11}}{108\pi\Delta f} + \frac{\phi_{2,5} - \phi_{2,14}}{162\pi\Delta f} + \frac{\phi_{3,8} - \phi_{3,17}}{216\pi\Delta f}\right)$$

where $\varnothing_{m,k}$ represents a phase shift of a pilot subcarrier signal on tone k and symbol m within the AMC slot.

8. The method of claim 6, wherein the compensating for the GD includes compensating for phase errors in the OFDM symbol, which may be caused by a radio frequency (RF) filter resulting from at least one of ambient temperatures at the receiving unit, any one of defects in radio frequency (RF) filter design, non-linearity of group delay across entire signal bandwidth.

9. The method of claim 6, wherein the receiving of the modulated signal includes receiving a broadband orthogonal frequency division multiplexing (OFDM) signal in of a Worldwide Interoperability for Microwave Access (WiMAX) compatible system, a $3^{rd}$ Generation Protocol Partnership (3GPP) LTE system, and Wireless Fidelity (Wi-Fi) based Wireless Local Area Networks (WLANs).

10. The method of claim 6, wherein the estimating and the compensating are employed in one of a mobile user station and a base station.

11. A radio device comprising:
   a transceiver operable to receive in an orthogonal frequency division multiplexing (OFDM) system a modulated signal that comprises one of a partially used sub-channel (PUSC) tile and an adaptive modulation and coding (AMC) slot;
   a processor coupled to a memory; and
   a group delay compensation (GDC) utility stored within the memory, and which executes on the processor to provide the functions of:
   estimating a group delay (GD), in frequency domain, a particular group delay associated with a particular frequency bandwidth or a number of consecutive tones,
   compensating for the GD, in the frequency domain, to apply a phase rotation to correct the particular group delay individually on tones of an OFDM symbol of the modulated signal in response to phase shifts resulted from the GD to generate a GD compensated modulated signal; wherein for the PUSC tile, when the GDC utility executes on the processor to provide the function of the estimating of the GD, the GDC utility executes on the processor to further provide the functions of:
   calculating a phase rotation $\varnothing_k$ for each of the tones of the OFDM symbol according to $$\varnothing_1 = \theta;$$

$$\varnothing_2 = \varnothing_1 - 2\pi\tau_1\Delta f = \theta - 2\pi\tilde{\lambda}\Delta f;$$

$$\varnothing_3 = \varnothing_2 - 2\pi\tau_2\Delta f = \theta - 6\pi\tilde{\lambda}\Delta f; \text{ and}$$

$$\varnothing_4 = \varnothing_3 - 2\pi\tau_3\Delta f = \theta - 12\pi\tilde{\lambda}\Delta f$$

where k is a tone index that takes a value from 1 to 4, θ is the phase rotation $\varnothing_1$ of a first tone of the PUSC tile and Δf is a tone spacing that depends on a OFDM signal bandwidth and Fast Fourier Transform (FFT) size; and estimating an averaged group delay compensation (GDC) coefficient $\tilde{\lambda}$ according to $$\tilde{\lambda} = \frac{1}{T}\sum_{t=1}^{T}\lambda_t$$

where T is total number of PUSC tiles having a same physical frequency and where $\lambda_t$ is an estimated group delay value for the PUSC tile t which is calculated based on the received pilot subcarrier signals according to $$\lambda_t = \frac{1}{2}\left(\frac{\phi_{1,1} - \phi_{1,4}}{12\pi\Delta f} + \frac{\phi_{3,1} - \phi_{3,4}}{12\pi\Delta f}\right)$$

where $\emptyset_m$ represents a phase shift of a demodulated pilot subcarrier signal on tone k and OFDM symbol m within the PUSC tile t.

12. The radio device of claim 11, wherein for the AMC slot, when the GDC utility executes on the processor to provide the function of the estimating of the GD, the GDC utility executes on the processor to further provide the functions of:

calculating a phase rotation $\emptyset_k$ for each of the tones of the OFDM symbol according to $$\emptyset_k = \emptyset_{k-1} - 2\pi\tau_{k-1}\Delta f = \theta - \pi\tilde{\lambda}(k-1)k\Delta f \text{ for } k=1, 2, \ldots, 18$$

where θ is a phase shift of a first tone in the AMC slot, k is tone index of the slot; and Δf is a tone spacing that is a function of a OFDM signal bandwidth and Fast Fourier Transform (FFT) size; and estimating an averaged group delay compensation (GDC) coefficient $\tilde{\lambda}$ for the AMC slot according to $$\tilde{\lambda} = \frac{1}{S}\sum_{s=1}^{S}\lambda_s$$

where S is a total number of slots in a band that has a same physical frequency, and where $\lambda_s$ is an estimated GD value for the AMC slot s based on the phase shifts, of the received demodulated pilot subcarrier signals, and is calculated as $$\lambda_s = \frac{1}{3}\left(\frac{\phi_{1,2} - \phi_{1,11}}{108\pi\Delta f} + \frac{\phi_{2,5} - \phi_{2,14}}{162\pi\Delta f} + \frac{\phi_{3,8} - \phi_{3,17}}{216\pi\Delta f}\right)$$

where $\emptyset_{m,k}$ represents a phase shift of a pilot subcarrier signal on tone k and symbol m within the AMC slot.

13. The radio device of claim 11, wherein when the GDC utility executes on the processor to provide the function of the compensating for the GD, the GDC utility executes on the processor to further provide the functions of:

compensating for phase errors in the OFDM symbol, which may be caused by a radio frequency (RF) filter resulting from at least one of ambient temperatures at the transceiver, any one of defects in radio frequency (RF) filter design, non-linearity of group delay across entire signal bandwidth.

14. The radio device of claim 11, wherein the receiving of the modulated signal includes receiving a broadband orthogonal frequency division multiplexing (OFDM) signal in of a Worldwide Interoperability for Microwave Access (WiMAX) compatible system, a 3$^{rd}$ Generation Protocol Partnership (3GPP) LTE system, and Wireless Fidelity (Wi-Fi) based Wireless Local Area Networks (WLANs).

15. The radio device of claim 11, wherein the radio device is one of a mobile user station and a base station.

* * * * *